Patented Dec. 3, 1940

2,223,575

UNITED STATES PATENT OFFICE 2,223,575

ADHESIVE COMPOSITIONS

Earle C. Pitman, Lincroft, N. J., assignor to E. I. du Pont de Nemours & Company, Wilmington, Del., a corporation of Delaware No Drawing. Application July 15, 1936, Serial No. 90,727

1 Claim. (Cl. 134—79)

This invention relates to improved heat energizable adhesive compositions, which, when applied to suitable bases, present substantially non-tacky surfaces at ordinary room temperatures, but which nevertheless afford satisfactory adhesive properties at elevated temperatures.

Heat energizable adhesives have been successfully employed in the art of uniting objects and have been particularly useful in laminating paper, wood veneer, regenerated cellulose sheeting, fabrics, metal foil, etc. However, they have been characterized by a serious defect, in that objects coated with these materials could not be stored with coated surfaces in direct contact or in contact with adjacent uncoated surfaces, even at normal room temperatures, without premature sticking together of a part or all of the surfaces, sometimes causing complete loss of the coated stock. This factor is of considerable concern in cases such as presented in utilizing the adhesives for coating paper and the like, where it is frequently required that the coated paper be rolled up or stacked in separate sheets and stored for extended periods prior to the actual fabrication of the ultimate article. This premature sticking tendency is exaggerated during summer climatic conditions when high temperatures combined with high humidities prevail.

It is, therefore, an object of this invention to provide a heat energizable adhesive which when applied to suitable surfaces, is substantially non-tacky at ordinary room temperatures but which becomes highly tacky or sticky at elevated temperatures. Another object of the invention is the provision of a heat energizable adhesive which permits the rolling up or stacking of paper and the like coated with the adhesives without premature sticking of the coated surfaces. A further object of the invention is the provision of a heat energizable adhesive which greatly extends the commercial utilization of adhesives of this class in affording satisfactory storage and shipping properties. A still further object of the invention is the provision of a heat energizable adhesive coated article such as paper, cloth, metal foil, etc., which may be rolled or stacked with coated surfaces in direct contact or in contact with the base at normal temperatures without premature sticking but which may be subsequently united by the application of heat and pressure. Other objects will appear hereinafter.

These objects are accomplished by the utilization, in conjunction with a heat energizable adhesive, of a wax or wax-like material in such proportions that the sticking tendencies which characterize previously available adhesives of this type are overcome without adversely affecting the adhesive properties which are developed upon the application of heat.

A preferred form of the invention for general purposes comprises a heat energizable adhesive, containing a suspension, at ordinary temperatures, of a high melting wax or wax-like material in a finely divided state, which melts or passes into solution at the working temperatures of the adhesive. When a heat energizable adhesive is applied as a liquid to a transparent base such as regenerated cellulose sheeting, an alternative treatment consists in the sifting onto the adhesive layer, after it is dried and before the regenerated cellulose ribbon or sheet coated with it is rolled up, of a finely powdered wax or wax-like material which is uniformly applied with the assistance of a soft bristled rotary brush. Another similar brush removes the surplus wax which is carried away by means of suction.

In order to illustrate the invention, the following examples are given which are illustrative only and are not to be considered limitative:

Example 1

This example represents one form of the invention in which a wax is suspended in the heat energizable adhesive composition. One part of carnauba wax and three parts of solvent naphtha are ground in a pebble mill for about 12 hours or until a fine suspension of the wax in the hydrocarbon is obtained. The wax suspension is added in the proper proportions to the other ingredients of the composition according to the following formula:

| | Per cent by weight |
|---|---|
| Cellulose nitrate | 7.5 |
| Denatured alcohol 23A | 9.2 |
| Toluol | 27.0 |
| Dibutyl phthalate | 5.9 |
| Ethyl acetate (absolute) | 29.4 |
| Carnauba wax | 1.5 |
| Solvent naphtha | 4.5 |
| Rezyl balsam * | 2.7 |
| Synthetic resin ** | 12.3 |
| | 100.0 |

*The rezyl balsam in this example, known as rezyl balsam #33 and sold by the American Cyanamid and Chemical Corporation, is a soft alkyd resin. This resin has been described by its manufacturer as being a diethylene glycol-phthalic anhydride ester modified with cocoanut oil. Its acid number is from 26 to 32. It is a viscous liquid at ordinary temperatures having a color in a 50% solution of toluene not darker than #4 of the Gardner-Holdt color tubes.

**The synthetic resin in the above example is a reaction product of:

| | Per cent |
|---|---|
| Phthalic anhydride | 45.8 |
| Glycerol | 28.8 |
| Castor oil | 25.4 |
| | 100.0 |

The viscosity characteristic of the cellulose nitrate in this example is about 3 seconds as determined by A. S. T. M. procedure D–301–33, Formula B.

The resin is prepared by charging the above ingredients into an aluminum kettle fitted with a mechanical stirring device. The batch is heated to 225° C. in 30 minutes and held at this temperature until an acid number of 13-15 is reached, stirring being maintained throughout the run. The heating cycle requires about 4½ hours.

Denatured alcohol 23-A is U. S. Internal Revenue Bureau formula which is composed of 100 gallons of 95% by volume ethyl alcohol to which has been added 10 gallons of acetone U. S. P.

This composition was coated on aluminum foil, rolled up and stored during the summer at room temperature for thirty days. At the end of this storage period the foil was unrolled without indication of adverse sticking tendencies and laminated to a cork composition sheeting without undue loss of adhesive properties. A similar adhesive composition without the wax ingredient, applied to aluminum foil and stored under the same conditions for the same period, adhered so badly to adjacent surfaces in the roll as to render the foil useless for the purpose of uniting it to a cork composition base. In fact, the foil coated with the heat energizable adhesive composition containing the wax showed less sticking after thirty days than occurred in one day with the foil coated with the composition without the wax.

Example 2

This example illustrates the use of a wax-like material such as a metallic stearate suspended in a heat energizable adhesive composition which has been found particularly useful for coating paper. One part of zinc stearate and three parts of denatured alcohol are ground in a pebble mill for about 12 hours or until a fine suspension of the stearate in the alcohol is obtained. The material is added in the proper proportions to the other ingredients of the composition according to the following formula:

| | Per cent by weight |
|---|---|
| Cellulose nitrate | 10.7 |
| Denatured alcohol 23A | 13.0 |
| Ethyl acetate (absolute) | 32.5 |
| Toluol | 2.4 |
| Dibutyl phthalate | 6.6 |
| Synthetic resin solution A* | 4.2 |
| Synthetic resin solution B** | 30.0 |
| Zinc stearate | 0.6 |
| | 100.0 |

*The resin solution A of the above example consists of a mixture of 50 parts of toluol and 50 parts of synthetic resin made by Beck, Koller & Company and known as Beckacite #1118 (which is a maleic acid modified ester gum). This resin contributes to some extent to the reduction in residual surface tack. In the absence of this ingredient the amount of wax-like material must be increased to attain the desired results.

**The resin solution B consists of a mixture of 50 parts of toluol and 50 parts of a synthetic resin which is a reaction product of:

| | Per cent |
|---|---|
| Hydrogenated cocoanut oil | 24.0 |
| Glycerine | 28.5 |
| Phthalic anhydride | 47.5 |
| | 100.0 |

The viscosity characteristic of the cellulose nitrate in this example is about 4 seconds as determined by A. S. T. M. procedure D-301-33, Formula B.

This resin is prepared by first heating the glycerine and hydrogenated cocoanut oil with agitation at approximately 480° F. in a kettle provided with a reflux condenser, until a test sample of the glyceride provides a homogeneous solution in a 50% solution of 95% by volume methyl alcohol. The phthalic anhydride is then added and heating continued at 212-218° C. until an acid number of about 24-27 is obtained. It is desirable also to blanket the charge with an inert gas, as described in U. S. Patent No. 1,974,742 by Hopkins and McDermott, during the period of adding the phthalic anhydride and the last stage of preparation of the resin.

Example 3

| | Per cent by weight |
|---|---|
| Synthetic resin* | 62.0 |
| Denatured alcohol 23A | 11.6 |
| Ethyl acetate (absolute) | 10.0 |
| Dibutyl phthalate | 12.4 |
| Carnauba wax | 4.0 |
| | 100.0 |

*The synthetic resin used in this example is a vinyl acetate polymer. A resin made by Carbide & Carbon Chemicals Corporation and known as Vinyloid A (viscosity 15), is satisfactory. The composition is prepared as in Example 1, which provides for a preliminary grinding of the wax in part of the solvent vehicle, which may be alcohol in this case, with subsequent addition of this suspension to the other ingredients of the composition. This adhesive is useful in coating cloth bases, where it may be conveniently applied by conventional knife coating procedures. The added wax ingredient permits the rolling up of the coated base without sticking during normal storage periods.

Example 4

Equal parts of synthetic rubber substitute such as neoprene described in U. S. Patent No. 1,950,431 by Carothers and Collins, and coumarone-indene resin such as Cumar as manufactured by The Barrett Co. are dispersed in sufficient xylene to permit satisfactory knife coating of the adhesive. This composition, when applied to a fabric base, remains in a very tacky condition at ordinary room temperatures after the evaporation of solvents. An application of finely powdered carnauba wax to the coated surfaces of the fabric is sufficient to prevent sticking together of the plastic during storage and shipment periods. A cloth base treated in this manner may be firmly united to leather or wood by heating to a temperature of approximately 95° C. and applying pressure.

Example 5

| | Per cent by weight |
|---|---|
| Shellac (dewaxed) | 22.0 |
| Denatured alcohol 23A | 73.8 |
| Tricresyl phosphate | 3.0 |
| Carnauba wax | 1.2 |
| | 100.0 |

This composition is prepared as in Example 1, which provides for a preliminary grinding of the wax in part of the solvent vehicle, namely, denatured alcohol in this case, with subsequent addition of this suspension to the other ingredients of the composition. This adhesive is useful in coating cloth, regenerated cellulose sheeting and paper bases, where it may be conveniently applied by conventional spraying procedures. The added wax ingredient eliminates sticking tendencies at normal room temperatures in the dried coating of this adhesive and permits the coated base to be rolled up or stacked in separate sheets and stored for extended periods.

When the composition of the above example was sprayed on one side of regenerated cellulose sheeting and stacked in sheets with coated surfaces in contact with uncoated surfaces under a pressure of ½ lb. per square inch for 16 hours at 45° C., the sheets could be separated without difficulty. Regenerated cellulose sheeting sprayed on one side with a similar composition free from wax stuck together badly when subjected to the same storage treatment. There was no noticeable difference in the heat sealing properties of the sheeting coated with these two thermoplastic compositions.

I am aware that it has been proposed to coat regenerated cellulose sheeting with heat sealing compositions containing small amounts of wax. Such compositions are somewhat deficient in ultimate joint strength, that is, when two sheets of regenerated cellulose so joined are pulled apart, the separation occurs in the heat sealing coating itself and the sheeting itself is not affected. In general, my invention is concerned with adhesive coatings of much greater joint strength. This high joint strength is produced by the use of compositions containing a relatively high proportion of thermoplastic resin. Ordinarily the resin will be present in a proportion at least half as great as that of the cellulose derivative, and for best results the amount of resin should be as great as or greater than the amount of the cellulose derivative. I have also found that relatively thick coatings must be applied to bases such as paper or regenerated cellulose sheeting in order to obtain the maximum strength of joint. As the thickness of the coating is increased, there is a corresponding increase in tackiness of the dried composition, but this can be overcome by the incorporation of a wax or wax-like substance in accordance with this invention.

The invention is applicable to various types of heat energizable adhesives, which are quite generally characterized by tacky surfaces at ordinary room temperatures. For example, the modification may be successfully employed with certain of the heat energizable adhesives described in the co-pending applications of Edgar S. N. 658,270 filed Feb. 23, 1923, now Patent No. 2,064,802.

The amount of wax or wax-like material required to overcome the undesirable residual tackiness of the dry adhesive film at normal room temperatures without adversely affecting the latent adhesive properties which develop at elevated temperatures is dependent upon the specific character of the adhesive to be treated, the pressure exerted by adjacent surfaces, the prevailing temperature conditions, and storage period of the adhesive coated article. Obviously, an adhesive of the class described which has greater residual tackiness will require larger proportions of the modifying agent. However, in general it has been found that amounts of wax or wax-like material between 1% and 10% of the total solids of the adhesive compositions are effective.

In order that the wax or wax-like material may be melted or substantially dissolved at the operating temperature of cellulose derivative heat energizable adhesives, it is preferred to use with such compositions a wax or wax-like material that has a melting point not exceeding the decomposition point of the dried adhesive coating. In adhesive compositions containing cellulose nitrate, this melting point should not greatly exceed 135°

C. The following waxes and wax-like materials are operable in the present invention: metallic stearates, particularly of aluminum, calcium, zinc, etc., waxes such as carnauba, candelilla, hydrogenated castor oil, montan, flaxseed, beeswax, raphia, cottonseed, condang, pisang, ocotilla, psylla, bayberry, coffee berry, palm, japan, myrtle, ceresin, ozokerite, synthetic waxes such as chlorinated naphthalene, and paraffin waxes.

In regard to the solvent mixtures employed in these compositions, those commonly used in the lacquer industry are generally satisfactory since their function is simply to provide a suitable vehicle for the film forming ingredients. Those which render the wax or wax-like materials incorporated therein substantially insoluble are preferred.

The compositions of this invention can be applied by brushing, dipping, spraying, or knife-coating methods. The volatile ingredients are then evaporated, leaving some of the wax or wax-like particles which are insoluble in the adhesive composition at ordinary room temperatures as a surface layer or protruding from the surface of the coating, thereby rendering the surface less tacky and preventing stickiness in the coated surfaces prior to lamination. As the ultimate article is formed by the application of heat, the wax or wax-like material melts or enters into solution with the heat energizable adhesive and becomes more uniformly distributed throughout the body of the film, thereby avoiding any substantial reduction in the adhesive properties of the film at the surface.

This invention is particularly applicable to the treatment of paper, metal foil, regenerated cellulose sheeting, fabrics, wood veneer, pasteboard and the like which may be in direct contact during storage periods prior to lamination to form the ultimate article. The invention is particularly adapted to cases where the improved heat energizable compositions applied to materials supplied in the form of sheets, ribbons, and the like, in that tackiness of the surface is substantially overcome during transportation and storage periods in warm, humid atmospheres.

The expression "heat energizable" as used in the specification and claim is intended to define an adhesive which may be applied as a solution or dispersion but after the solvents have evaporated does not require the further application of solvents to activate it. After the solvents have evaporated, the adhesive is activated, that is, rendered sufficiently tacky or sticky to produce a satisfactory joint upon the application of suitable heat and/or pressure.

By the term "elevated temperatures" I mean temperatures which are substantially in excess of normal temperatures which prevail during storage and shipping periods, but are below the decomposition temperature of the adhesive coatings.

It is apparent that many widely different embodiments of this invention may be made without departing from the spirit and scope thereof; and, therefore, it is not intended to be limited except as indicated in the appended claim.

I claim:

A heat energizable adhesive composition capable of forming high joint strength, the non-volatile ingredients of which consist essentially of thermoplastic, non-drying vegetable oil modified alkyd resin, cellulose nitrate, and plasticizer, dispersed in a liquid volatile solvent vehicle for the cellulose nitrate and from 1 to 10% by weight based on the total solids of the adhesive composition of a wax having a melting point below 135° C. and which is insoluble in the said solvent and incompatible with the said non-volatile ingredients, a dry film of the said adhesive composition containing a surface layer of insoluble wax particles, the said resin being present in amount at least equal to the amount of cellulose nitrate in the adhesive composition.

EARLE C. PITMAN.